United States Patent
Berkbuegler

(10) Patent No.: US 6,799,659 B2
(45) Date of Patent: Oct. 5, 2004

(54) TREE STAND WITH QUICK CONNECT ATTACHMENT

(76) Inventor: Ronald L. Berkbuegler, 8767 Old Lebanon/Troy Rd., Troy, IL (US) 62294

( * ) Notice: Subject to any disclaimer, the term of this patent is extended or adjusted under 35 U.S.C. 154(b) by 0 days.

(21) Appl. No.: 10/109,519

(22) Filed: Mar. 28, 2002

(65) Prior Publication Data

US 2003/0205431 A1 Nov. 6, 2003

(51) Int. Cl.[7] .............................................. A01M 31/00
(52) U.S. Cl. ....................... 182/187; 182/136
(58) Field of Search ................................ 182/187, 188, 182/135, 136

(56) References Cited

U.S. PATENT DOCUMENTS

| | | | |
|---|---|---|---|
| 4,331,216 A | * | 5/1982 | Amacker .................... 182/135 |
| 4,428,459 A | | 1/1984 | Peck |
| 4,437,647 A | | 3/1984 | Cruse |
| 4,615,545 A | | 10/1986 | Cruse |
| 4,765,657 A | | 8/1988 | Cruse |
| 4,834,217 A | * | 5/1989 | Manes ........................ 182/187 |
| 4,995,475 A | * | 2/1991 | Berkbuegler ................ 182/187 |
| 5,009,283 A | * | 4/1991 | Prejean ....................... 182/116 |
| 5,167,298 A | | 12/1992 | Porter |
| 5,433,291 A | * | 7/1995 | Shoestock, Sr. ............. 182/20 |
| 5,445,358 A | | 8/1995 | Anderson |
| 5,584,358 A | | 12/1996 | Stone et al. |
| 5,642,789 A | * | 7/1997 | Maxwell ..................... 182/135 |
| 5,680,910 A | | 10/1997 | Sarphie, IV |
| 5,975,242 A | | 11/1999 | Woller et al. |
| 5,979,603 A | | 11/1999 | Woller |
| 5,996,738 A | | 12/1999 | Nelson |
| 6,244,556 B1 | * | 6/2001 | Carrillo et al. ............. 248/519 |
| 6,523,642 B1 | * | 2/2003 | Graham ....................... 182/136 |

\* cited by examiner

*Primary Examiner*—Alvin Chin-Shue
(74) *Attorney, Agent, or Firm*—Senniger Powers

(57) ABSTRACT

A tree stand which is easily securable to a tree. The tree stand includes a platform and first and second laterally spaced support arms, each of the arms having a front end and a back end, the front ends being secured to the platform. A yoke capable of being passed around a trunk of the tree is interconnectable with the back ends of the arms such that the yoke extends between the back ends. A quick connect coupling is located at one or more of the interconnections of the yoke and arms. The coupling has interengageable coupling members mounted on the yoke and corresponding arm, the quick connect coupling configured to automatically secure the yoke to the corresponding arm when the coupling members are interengaged.

12 Claims, 6 Drawing Sheets

TREE STAND WITH QUICK CONNECT ATTACHMENT

BACKGROUND OF THE INVENTION

This invention relates generally to platform assemblies, and in particular to a tree stand which may be detachably secured to the trunk of a tree with a quick connect mechanism for supporting a person in the tree.

Portable tree stands are used for supporting hunters, photographers, and nature enthusiasts at an elevated position in a tree to watch for game or observe wildlife. At that position, the view of the surrounding terrain is increased, a field of aim is improved, and the user is less likely to be seen by wildlife. Some tree stands include two separate platforms, such as a foot platform and a seat, which are alternately raised by the user to climb the tree and attain a desired elevation.

Unfortunately, it is difficult to attach a tree stand to a tree. The user must hold the platform in position adjacent to a tree trunk, and simultaneously move a securement member, such as a yoke, around a back side of the tree trunk. The yoke must be aligned with a corresponding part of the stand and secured by a suitable means, e.g., inserting a locking pin through registering holes. These tasks are awkward for the user because one hand is occupied supporting the platform, leaving the other free hand to move the yoke around the tree, align and secure it. Aggravating the difficulty is that the user is frequently at an uncomfortable position, standing on a ladder or branch of a tree. Further, the environment is frequently dark, wet or cold, and the user must simultaneously minimize noise to avoid alerting nearby wildlife. These tasks are potentially hazardous, and many users have inadvertently lost balance, fallen, and received injury.

SUMMARY OF THE INVENTION

Among the several objects and features of the present invention may be noted the provision of a tree stand which is easily attached to a tree; the provision of such a tree stand which a user may attach to the tree with motion of one hand; the provision of such a tree stand which may be placed in a locked position to prevent inadvertent detachment from the tree; the provision of such a tree stand which is easily detached from the tree; and the provision of such a tree stand which is economical.

In general, a tree stand according to the present invention is easily securable to a tree and comprises a platform and first and second laterally spaced support arms. Each of the arms has a front end and a back end, the front ends being secured to the platform. A yoke passes around a trunk of the tree, generally between the back ends of the arms, for use in securing the tree stand in the tree. The yoke has first and second opposite ends, the second end being connected to the tree stand generally at one of the arms. A quick connect coupling is adapted to releasably connect the first end of the yoke to the tree stand generally at the back end of the other of the arms. The coupling comprises interengageable coupling members, one being mounted on the yoke and the other being mounted on the tree stand generally at the back end of the other of the arms. The quick connect coupling is configured to automatically secure the yoke to the corresponding arm when the coupling members are interengaged.

In another aspect, a tree stand of the present invention comprises a platform having an inner end engageable with a tree trunk and an outer end. A pair of arms, one at each side of the platform, are each connected to the platform adjacent its outer end for holding the platform. Links are connected to the platform adjacent its inner end and connected to the arms. A rigid yoke engages with a side of the tree trunk opposite the platform. The yoke is interconnected at one end thereof with the tree stand generally adjacent an inner end of one of the arms for pivoting about an axis parallel to the one arm and about an axis perpendicular to the one arm for movement between an open position and a closed position in which the yoke extends generally between the inner ends of the arms for straddling the tree trunk to mount the tree stand on the tree. The inner end of the other arm and the other end of the yoke have quick connect coupling members thereon which are adapted to be locked together for securing the yoke in its tree-straddling closed position.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENT

Figure 1:
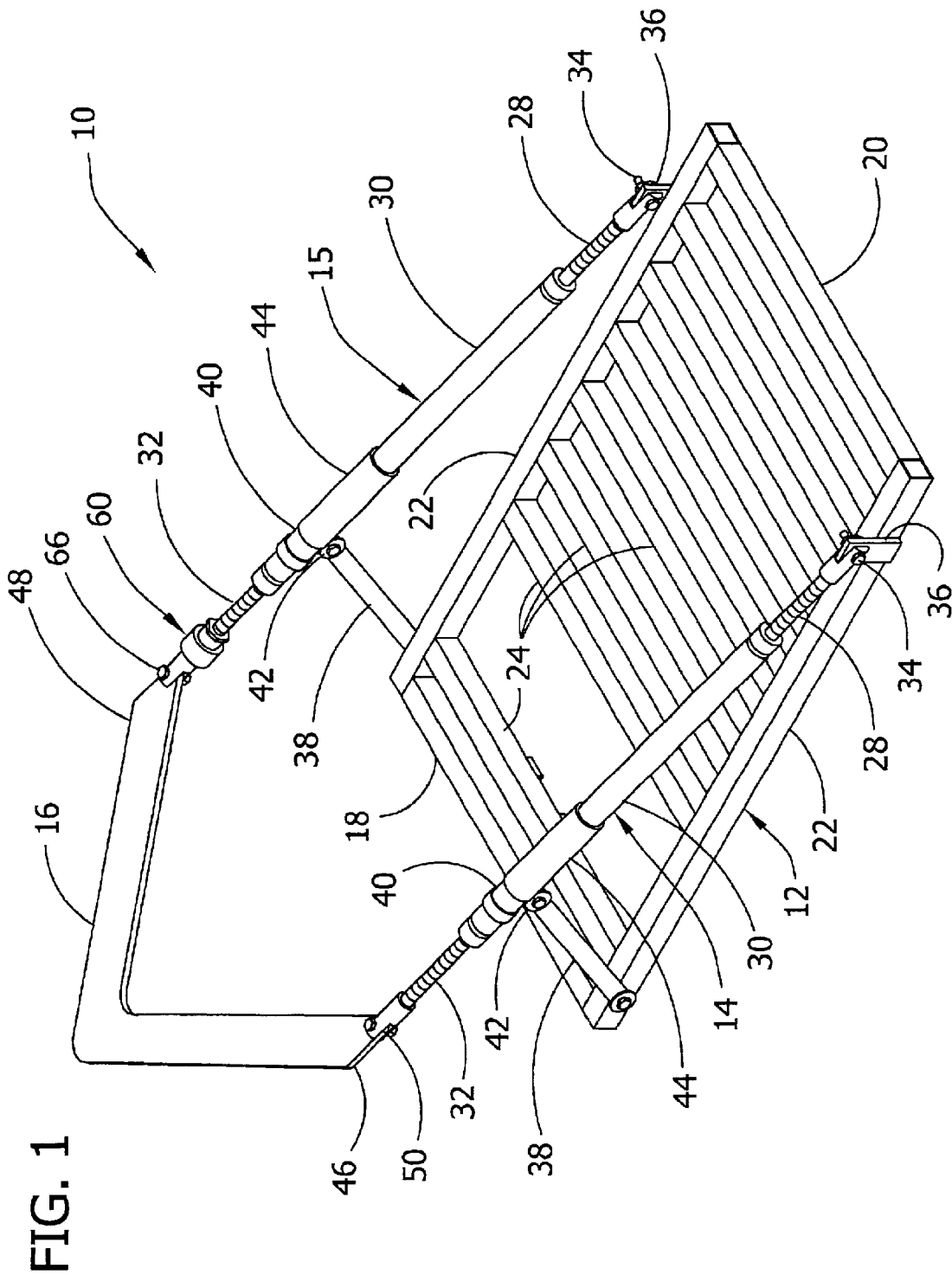
FIG. 1 is a perspective of a tree stand of the present invention.

Referring now to the drawings and in particular to FIG. 1, a tree stand of the present invention is indicated generally at 10. The tree stand 10 includes a platform 12, a pair of support arms 14 and 15, and a V-shaped yoke 16 for passing around a trunk of a tree (not shown).

The platform 12 has an inner end 18 for engagement with the tree trunk, an outer end 20, and lateral sides 22, collectively forming a generally rectangular shape. Several parallel, spaced slats 24 extend between the sides 22 and are configured for supporting a load, typically the weight of a person. The platform 12 is preferably formed from lightweight tubes of a metal, such as aluminum, which are welded together. The inner end 18 is configured for placement in an orientation generally tangential to the tree trunk. A brace (not shown) may protrude from the inner end 18 to engage the tree and stabilize the platform on the tree. Alternate materials, constructions, or shapes of the platform 12, including a solid or meshed panel, do not depart from the scope of this invention.

The first and second support arms 14, 15 are positioned at each side of the platform 12 and are pivotally connected to the platform generally adjacent the outer end 20. Each arm 14, 15 includes a first threaded rod 28 on an outer end of the arm, an internally threaded adjustment sleeve 30, and a second threaded rod 32 on an inner (or "back") end of the arm. A bolted clevis 34 pivotally connects each first threaded rod 28 to an upright tab 36 on the respective side of the platform 12.

Links 38 are provided which interconnect the arms 14, 15 and platform 12. Each link 38 has a bottom end which is pivotally secured to the side 22 of the platform generally adjacent the inner end 18. A top end of each link 38 is pivotally secured to the respective arm, generally adjacent its inner end. A tubular collar 40 on each arm includes a downwardly protruding tab 42 for pivotally attaching the respective link 38. The tubular collar 40 and tab 42 do not rotate with the respective adjustment sleeve 30.

The adjustment sleeves 30 are provided for adjusting an angle of inclination of the platform 12 to place the platform at a level orientation. Adjustment may be made while the tree stand 10 is unloaded or while a user is standing on the platform 12. The angle of inclination of the platform 12 may be adjusted by rotating both of the sleeves 30 about their longitudinal axes and thereby extending or contracting the arms 14 and 15. An enlarged hand grip 44 is formed on each adjustment sleeve 30 for convenience in adjusting arm length. Each sleeve 30 is internally threaded and receives the first threaded rod 28 and the second threaded rod 32. Preferably, the first and second rods 28, 32 have opposite screw threads (i.e., left handed vs. right handed threads) so that rotation accomplishes simultaneous extension or contraction on both ends of the respective arm 14 or 15. Rotation in a first direction lengthens the arm by progressively forcing both first and second threaded rods 28, 32 out of the sleeve 30. Rotation in a second, opposite direction shortens the arm by progressively forcing both first and second threaded rods 28, 32 into the sleeve 30. The links 38, arms 14, 15, and platform 12 are arranged and interconnected such that adjustment of arm length changes an angle formed between the arm and the plane of the platform.

In conventional use, the two arms 14 and 15 are adjusted to have about the same lengths. However, for unusual trees or for user preference, the arms 14 and 15 may be adjusted to differing lengths. The arms 14 and 15 may be shortened until they lie substantially parallel to the sides 22 of the platform, thereby placing the stand in a compact state suitable for portability. Moreover, the support arms may be made of a non-rigid cable or other flexible material (not shown) without departing from the scope of the present invention.

Similar support arm assemblies and tree stand are described in co-owned U.S. Pat. No. 4,995,475, entitled "Hunter's Portable Tree Stand," which is hereby incorporated by reference.

The V-shaped yoke 16 is a rigid bar configured for passing around a back side of the tree and engaging the trunk. The yoke is generally planar and has a first end 46 and a second end 48. The first end 46 is pivotally interconnected with the left-hand support arm 14 adjacent the inner end of the arm. The yoke 16 could be made of a flexible material, including a chain or cable, without departing from the scope of this invention.

A bolted clevis 50 pivotally attaches the first end 46 of the yoke to the arm 14. The clevis 50 has an internally threaded end which receives the second threaded rod 32 of arm 14 in a tight fit. Therefore, the clevis 50 and the yoke 16 are rotatable about an axis of the arm 14, in conjoint rotation with the second threaded rod 32. Consequently, the yoke 16 is rotatable about an axis generally parallel to or coincident with a longitudinal axis of the arm 14.

The yoke 16 is moveable in a swinging motion generally in a plane of the arms 14, 15 between an open position (not shown) which is suitable for application of the platform 12 to the tree and a closed position (FIG. 1) in which the yoke engages the other side of the tree straddling the tree. In the open position, the second end 48 of the yoke 16 is moveable in an arc of a circle centered in the pivotal interconnection of the yoke with the arm 14 (i.e., the bolt of the clevis 50), to a position generally intersecting the inner end of the opposite arm 15. Thus, the yoke 16 is pivotally moveable relative to the arm 14 in two axes, i.e., rotatable generally about the longitudinal axis of the arm and pivotable about the axis of the bolt of the clevis 50 which is generally perpendicular to the arm. That provides freedom of motion when attaching the stand 10 to the tree. The user can maneuver the yoke 16 as needed to fit the tree generally using a single hand, while holding the platform with the other hand. At the closed position, the yoke 16 defines a clamping plane which lies generally in the plane of the arms 14 and 15. Other structures for providing rotation of the yoke do not depart from the scope of this invention.

Figure 3:
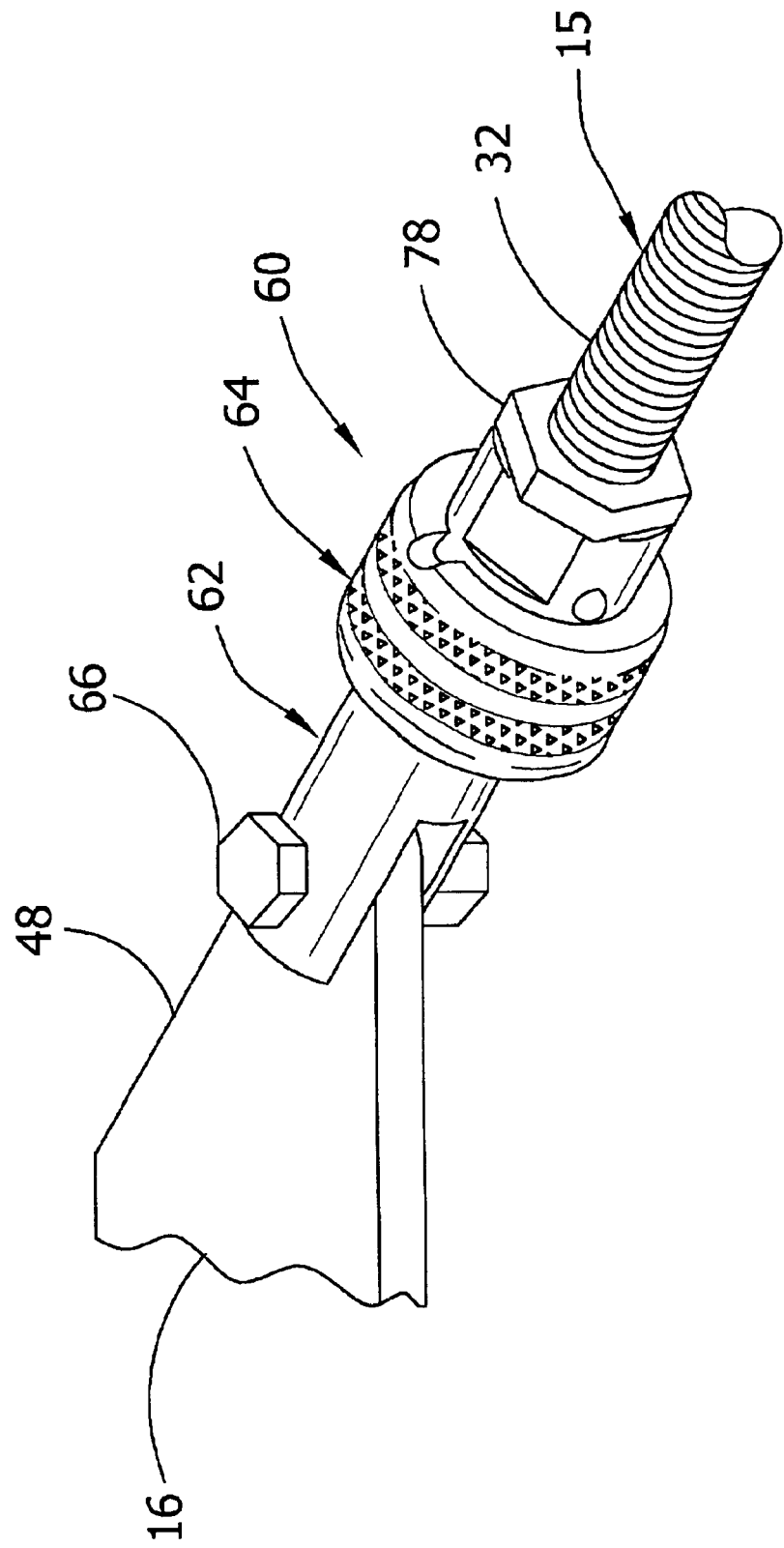
FIG. 3 is an enlarged, fragmentary perspective of the tree stand of FIG. 1 at a right end of a yoke and showing a quick connect coupling thereof.
Figure 4:
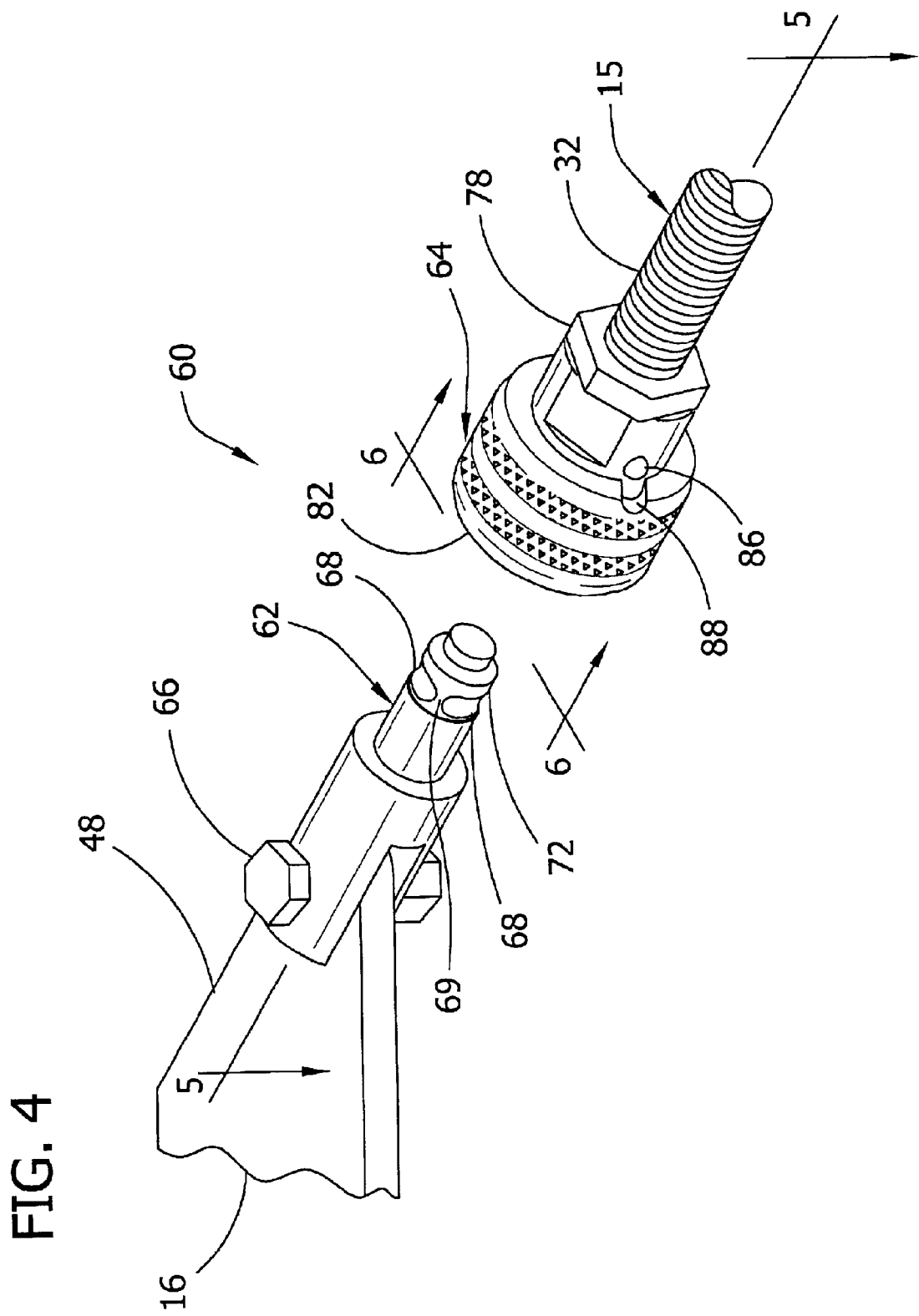
FIG. 4 is a view similar to FIG. 3 but in a detached position.

A quick connect coupling, indicated generally at 60, interconnects the second end 48 of the yoke 16 and the arm 15. The coupling 60 includes interengageable coupling members including a plug 62 and socket 64 (FIGS. 3 and 4) for locking the yoke 16 in its tree-straddling position by the act of swinging the yoke into its closed position. The coupling 60 is configured to quickly connect the coupling members to automatically secure the yoke 16 to the arm 15 when the coupling members are interengaged. The plug 62 comprises a male coupling member and the socket 64 comprises a female coupling member receptive of the plug by the act of swinging the yoke into its closed position, whereby the plug snap locks into the socket. As shown in FIGS. 3 and 4, the plug 62 is on the second end 48 of the yoke 16 and the socket 64 is on the arm 15, although the reverse position is also acceptable. The plug 62 is pivotally mounted to the second end 48 of the yoke by a bolt and clevis attachment 66, which facilitates an easier alignment of the plug 62 and socket 64. The plug 62 is generally cylindric and has three circumferentially spaced grooves 68 therein for engagement by three corresponding locking members 70 (FIG. 6) which are in the socket 64 to secure the plug in the socket. The grooves 68 extend circumferentially of the plug 62 and have approximately equal lengths. The three grooves 68 are separated by three barriers 69, which limit the relative rotation of the second threaded rod 32. This is needed so that the arms 14, 15 can be adjusted in length by turning the sleeve 30 relative to the rod 32. A circumferential ridge 72, formed adjacent the grooves 68, has a leading surface in the form of an inclined plane which facilitates quick connect coupling.

Figure 5:
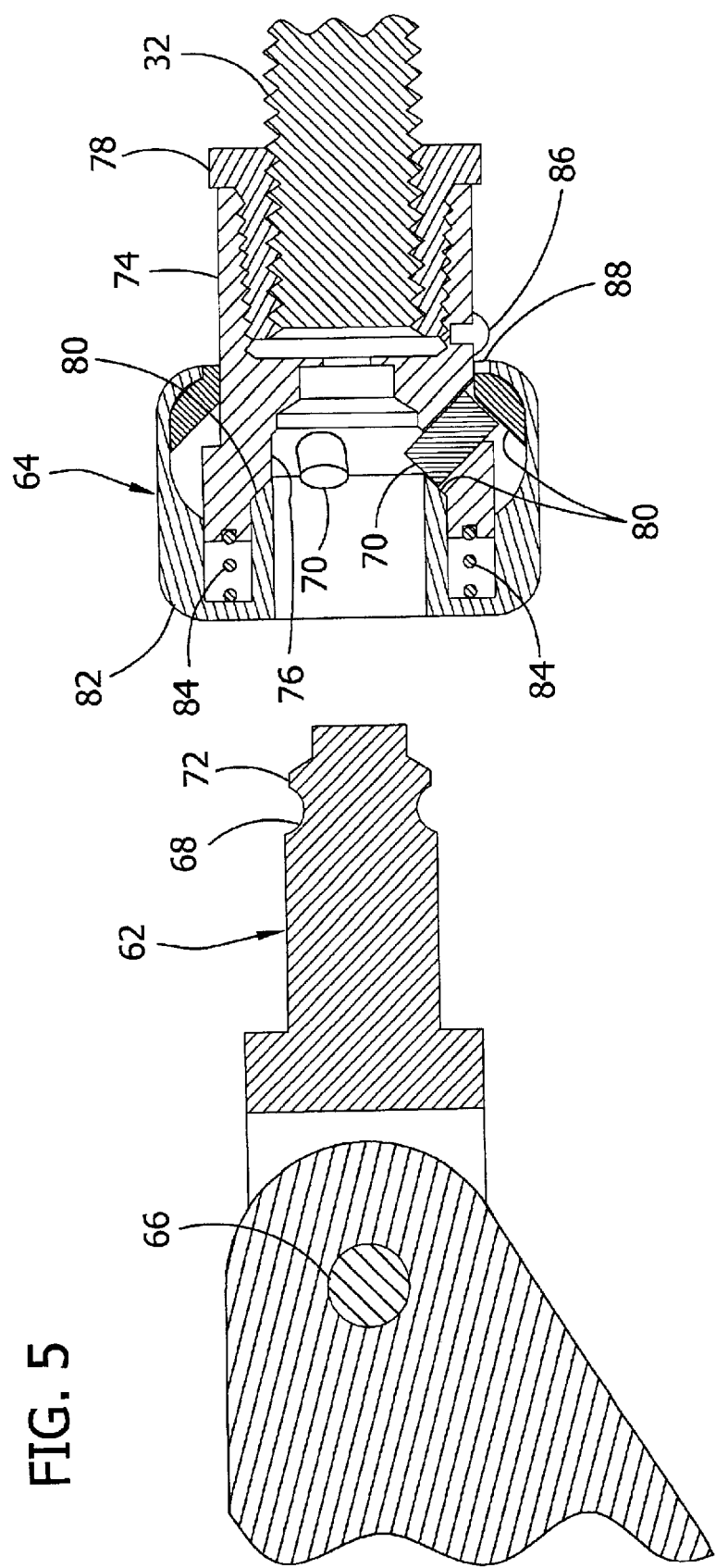
FIG. 5 is a section taken along line 5—5 of FIG. 4.
Figure 6:
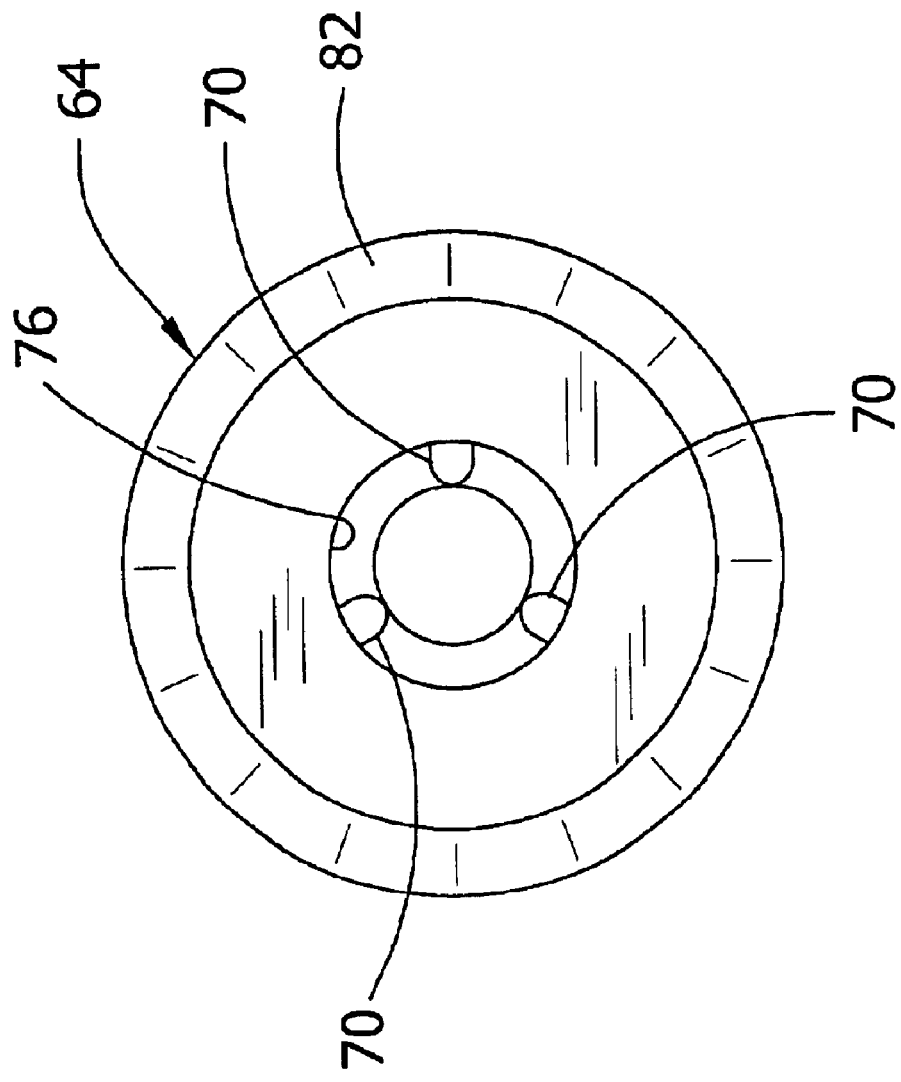
FIG. 6 is a view from the vantage indicated by line 6—6 of FIG. 4.

Referring to FIGS. 5 and 6, the socket 64 is a conventional quick connect coupling member which is conventionally intended for a fluid flow application. The socket may be obtained from one of several commercially available connect-disconnect coupling manufacturers, an example being a model 2800-SL of the Foster Manufacturing Company, having offices in Springfield, Mo. Many different sizes and configurations are equally effective, but in general the coupling should be capable of automatically locking upon interengagement of the coupling members.

The socket 64 includes a socket body 74 having a cavity 76 and which is attached to the second threaded rod 32 by an adapter 78. The three locking members 70 are circumferentially spaced, corresponding with the grooves 68 on the plug 62. The locking members 70 are generally cylindric, and are captured between partially opposed inclined surfaces 80. The locking members 70 are radially outwardly moveable under certain conditions described hereinafter to permit the ridge 72 of the plug 62 to pass the locking members when the plug is inserted or removed from the socket 64. The locking members 70 engage the plug 62 in the grooves 68 when the plug is inserted into the socket. The socket 64 could have alternate locking mechanisms, including but not limited to a single locking member 70, without departing from the scope of this invention.

A release 82 is provided for readily disconnecting the plug 62 and socket 64 to thereby detach the yoke 16 and arm 15 of the tree stand. The release 82 comprises a sleeve which encircles the socket body 74 and is moveable in axial translation relative to the body between a lock position (FIG. 5) wherein the cylindric locking members 70 extend into the cavity 76 and a release position (not shown) wherein the locking members may be moved radially away from the cavity and the ridge 72 of the plug is free to move therepast. The release 82 is biased by a spring 84 (FIG. 5) to the lock position. The spring 84 is captured between the socket body 74 and the release 82. The plug 62 may be inserted into the socket 64 in a snap lock fashion such that the plug automatically locks. The locking members 70 are engaged by the inclined leading surface of the ridge 72 and moved out of the cavity 76 allowing the ridge 72 to pass the locking members. Once the locking members 70 are in registration with the grooves 68, the spring 84 moves the release 82 axially outward and the locking members move radially into the grooves. Forces tending to move the plug 62 out of the socket 64 are resisted by engagement of the ridge 72 with the locking members 70, which moves the locking members against the rigid socket body 74 and resists movement of the locking members out of the grooves.

A stop 86 is provided (FIG. 4) on the socket body 74 and a corresponding notch 88 on the release 82. The notch 88 must be aligned with the stop 86 for the release 82 to be axially moveable. The release 82 is rotatable, when in the lock position, to a position wherein the release is not moveable in translation toward the release position because of engagement with the stop 86. Thus, the release 82 may be rotated until the notch 88 is misaligned with the stop 86 to prevent inadvertent release of the plug 62 from the socket 64.

It is understood that different types of suitable couplings, other than a plug and socket, could be used without departing from the scope of this invention. Further, it is understood that the coupling 60 could be positioned at a variety of locations on the tree stand 10, or there could be multiple couplings. However, in general the coupling should be of a quick connect configuration. Couplings requiring substantial additional steps beyond bringing the member into engagement, e.g., insertion of a pin into aligned members, are not quick.

The plug 62 may have one continuous groove which extends around the entire circumference of the plug. However, an advantage of multiple grooves 68 separated by the barriers 69 is that unintended conjoint rotation of the socket 64 with the second threaded rod 32 is prevented. For example, when a user rotates the adjustment sleeve 30 to expand the length of arm 15, the adjustment sleeve should rotate relative to the second threaded rod 32 and force the rod into or out from the sleeve. However, due to internal friction, there is a tendency for the second threaded rod 32 to rotate along with the adjustment sleeve 30. That is prevented by the engagement of the locking members 70 with the barriers 69 of the plug 62. Each groove 68 has a limited circumferential extent within which a corresponding locking member 70 is captured. If the groove were continuous about the entire plug 62, the locking members 70 could continually move therein, with the result that the socket 64 and second threaded rod 32 could rotate conjointly with the adjustment sleeve 30.

A significant advantage of the present invention is that the user may move the yoke 16 with one hand to more easily attach the yoke to the arm 15. Typically, the yoke 16 is hanging downwardly from its first end 46 at the bolted clevis 50 while the user with a first hand places the platform 12 in position adjacent the tree. The user grasps the yoke with a second hand and rotates it about the axis of the arm 14 into the plane of the arms 14, 15 and rotates the yoke about the bolted clevis 50 toward the arm 15. Its attachment does not require a fastener, an alignment of registering holes, nor a movement of the yoke perpendicular to the clamping plane for engagement in some retaining device, which might require two hands or at the least would be awkward with one hand from one side of the tree. The yoke 16 can be moved with one hand from one side of the tree generally along a path of motion within the clamping plane to engage and attach to the arm 15. The plug 62 easily aligns with the socket 64 and snap locks when inserted in the socket.

Figure 2:
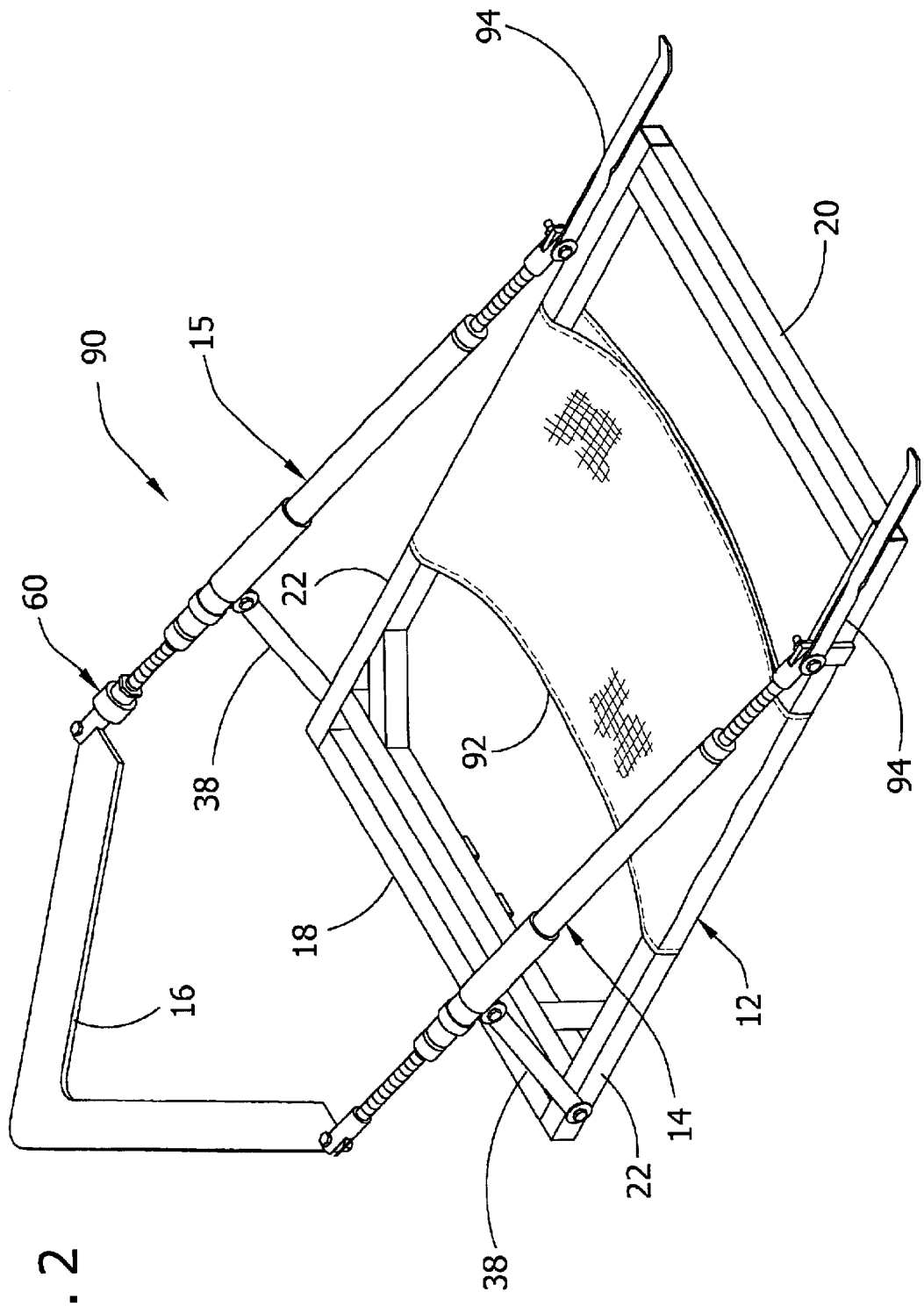
FIG. 2 is a perspective of a second tree stand of the present invention.

A second tree stand, indicated generally at 90, is shown in FIG. 2. The second stand 90 may be used together with the first stand 10 to climb a tree by alternately raising the two stands until attaining a desired elevation. As known to those skilled in the art, the two stands comprise a climbing tree stand system where the user rests on one stand while moving the other. In place of a number of slats 24, the second tree stand 90 has a seat 92 extending between the sides 22 of the platform. Two deployable rests 94 for supporting a weapon are provided, generally at the outer end 20 of the platform. In other respects, the second stand 90 is substantially the same as the first stand 10. It is understood that the present invention may be used on a single stand or both of a pair of complementary stands without departing from the scope of this invention.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A tree stand which is easily securable to a tree, comprising:

a platform;

first and second laterally spaced support arms, each of the arms having a front end and a back end, the front ends being secured to the platform, at least the second support arm including a coupling member generally at the back end of the arm;

a yoke for passing around a trunk of the tree, generally between the back ends of the arms, for use in securing the tree stand in the tree, the yoke having first and second opposite ends, at least the second end including another coupling member;

the yoke being pivotally attached at the first end to said first arm, and being pivotally moveable relative to said first arm in two axes;

the coupling members defining a coupling adapted to releasably connect the second end of the yoke to the tree stand generally at the back end of said second arm, the coupling being configured to automatically secure the yoke to said second arm upon engagement of the yoke and said second arm.

2. A tree stand as set forth in claim 1 wherein the coupling members comprise a plug and socket, the plug being mounted on one of the yoke and said second arm and the socket being mounted on the other of the yoke and said second arm.

3. A tree stand as set forth in claim 2 wherein said plug is configured to snap lock into the socket when the plug is inserted into the socket.

4. A tree stand as set forth in claim 3 wherein said socket of the coupling has at least one locking member for engaging the plug when the plug is inserted into the socket.

5. A tree stand as set forth in claim 4 wherein said plug is generally cylindric and has at least one groove therein for engagement by said at least one locking member to secure the plug in the socket.

6. A tree stand as set forth in claim 5 wherein said socket has three locking members and said plug has three corresponding grooves spaced at equal circumferential intervals about the plug for engagement by said three locking members.

7. A tree stand as set forth in claim 2 wherein said coupling further comprises a release for disconnecting the yoke and second arm.

8. A tree stand as set forth in claim 7 wherein said release comprises a sleeve which encircles the socket and is moveable in translation relative to the socket between a lock position and a release position, the sleeve being biased to the lock position.

9. A tree stand as set forth in claim 8 wherein said sleeve is rotatable, when at the lock position, to a position wherein the sleeve is not moveable in translation toward the release position.

10. A tree stand as set forth in claim 1 wherein the yoke is pivotally moveable about an axis parallel to said first arm and about an axis perpendicular to said first arm for movement between an open position and a closed position in which the yoke extends generally between the back ends of the arms for securing the tree stand in the tree.

11. A tree stand as set forth in claim 2 wherein the plug is pivotally mounted to said second end of the yoke.

12. A tree stand as set forth in claim 1 further comprising at least one rest for supporting a weapon.

* * * * *